United States Patent [19]

Oakes

[11] Patent Number: 4,492,831

[45] Date of Patent: Jan. 8, 1985

[54] ELECTRICAL SWITCHGEAR

[76] Inventor: Martin C. Oakes, Hornbeam Cottage, White Gate, East Keswick, West Yorkshire, England

[21] Appl. No.: 481,274

[22] Filed: Apr. 1, 1983

[30] Foreign Application Priority Data

Apr. 5, 1982 [GB] United Kingdom ............... 8210054

[51] Int. Cl.³ .............................................. H01H 9/22
[52] U.S. Cl. ................................ 200/50 A; 361/344
[58] Field of Search ............ 200/50 R, 50 A, 50 AA, 200/50 B, 50 C; 361/335, 343, 344

[56] References Cited

U.S. PATENT DOCUMENTS

| 2,084,893 | 6/1937 | Davies | 361/335 |
| 2,600,304 | 6/1952 | Krida | 361/343 |
| 3,179,762 | 4/1965 | Swinney | 200/5 A |

FOREIGN PATENT DOCUMENTS

| 310848 | 10/1973 | Austria. |
| 0068951 | 1/1983 | European Pat. Off.. |
| 2949774 | 4/1981 | Fed. Rep. of Germany. |
| 1080772 | 8/1967 | United Kingdom. |

Primary Examiner—A. D. Pellinen
Assistant Examiner—Morris Ginsburg
Attorney, Agent, or Firm—Henry Sternberg

[57] ABSTRACT

High voltage electrical switchgear comprises a chamber (1) in which is enclosed input contacts (8), output contacts (24) and earth contacts (16). A movable switch (12) may connect either the input to the output contacts or the output to the earth contacts. The output contacts are connected by a conductor (25) extending through the wall of the chamber to a connector unit located externally of the chamber. The connector unit (27) has a conductor (32) moulded in situ in a housing (28) having a socket (30) receiving a plug (26) cast integrally with the chamber and through which the conductor (25) extends. An output cable (34) is connected to the connector unit, which also provides contacts (37) for connection to a test unit. A cover (40) protects the connector unit and interlock means (58,43) act to allow opening of the cover only when the switch (12) connects the output contacts with the earth contacts.

7 Claims, 4 Drawing Figures

ELECTRICAL SWITCHGEAR

This invention relates to electrical switchgear and other equipment and particularly to high voltage equipment which, in the context of this specification means voltages of 3.3 KV and over.

There are many types of high voltage switchgear currently available for switching a supply to an output cable. For various reasons, tests need to be run on these units from time to time. The general practice is for the unit to be earthed in order that the test equipment may be electrically connected in safety. Earth switches are therefore incorporated in the switchgear which also incorporates test connection points. Access to these points is generally difficult, requiring, for example, test probes to be engaged with contacts immersed in oil, and even potentially dangerous on certain arrangements that rely on a pressurised or hermetically sealed arc-quenching chamber, for example utilising oil or SF6 gas for arc-quenching purposes.

The object of the present invention is to provide an arrangement which will facilitate testing on high voltage electrical switchgear and equipment.

According to the invention electrical switchgear comprises a chamber; input contacts, output contacts and earth contacts located within the chamber; switch means within the chamber for connecting the input and output contacts or for connecting the output and earth contacts; a conductor electrically connected to the output contacts and extending through a wall of the chamber; a connector unit located externally of the chamber and providing contacts for connection respectively to the conductor, to an output conductor and to a test unit; a housing surrounding the connector unit, the housing including a cover openable to allow direct access to the test contacts of the connector unit; and interlock means coupled between the switch means and the cover to prevent opening of the cover unless the switch means connects the output and earth contacts.

By locating the test unit contacts externally of the chamber in which the switch means are located, access to the test unit contacts is greatly facilitated and there is no necessity for access into the switch contact chamber itself. The interlock between the cover and the switch means ensures that access to the test unit contacts cannot be gained unless the output contacts have been connected to earth, so rendering the unit safe.

The connector unit is desirably a unit in accordance with our copending United States Patent Application Ser. No. 467,868, filed Feb. 18, 1983. In the specification of that application we describe an electrical connector suitable for use with voltages of 3.3 KV and over, comprising a housing moulded from electrically insulating material and defining a body section and a stem projecting from the body section, an inwardly tapering socket opening into the body section from one end thereof, and a conductive terminal moulded in situ in the housing, the terminal having a part lying at the inner end of the socket and exposed to the socket and the terminal passing through the stem of the housing to terminate in a conductor connection section lying externally of the housing.

That connector, for use in the present invention, also has an auxiliary socket opening into the body section, the terminal being also exposed within the auxiliary socket.

Such a connector can be manufactured inexpensively and because the terminal has a conductor connection section lying externally of the housing the connector can be used in conjunction with any size or type of cable. This renders it particularly suitable for terminating many different types of cable in a cable connector unit that may be simply secured to a switchgear unit.

In connecting a cable or other output conductor to the switchgear unit, the conductor is connected to the conductor connection section of the terminal. The socket opening of the connector is then engaged over a tapered plug surrounding the conductor from the chamber, the plug electrically engaging the terminal within the socket, so connecting the output conductor to the movable switch contact. The terminal, where exposed in the auxiliary socket then forms a test unit contact and desirably extending from the terminal is an element to which a test probe may be connected. In one convenient form the conductor from the chamber may have a threaded end that projects through a hole at the inner end of the terminal and coaxial with the socket, onto which end a nut may be threaded to anchor the conductor in position in the socket and ensure that firm electrical connection is made. An extension of this threaded end beyond the nut can readily form the element to which a test probe may be secured.

In one particularly preferred embodiment the conductor from the chamber may be cast in situ in the chamber, which is moulded from a suitable plastics material. The tapered plug surrounding the conductor may then form an integral part of the moulded chamber. Using such a construction, earth shielding can be significantly reduced in comparison with existing units.

Preferably the auxiliary socket is closed by a cap which may be inserted into the auxiliary socket to seal this off, the cap having an axial recess which accommodates any projection from the conductor leading from the chamber. The cap will desirably be of insulating material and it may be designed to incorporate equipment such as a screen from which low voltage can be taken for a neon or other indicator. The cover may then be provided with a viewing port so that the indicator or indicators are visible from externally of the cable connector unit.

The cover may be slidably or, preferably, pivotally mounted on the housing and the type of interlock used will generally depend on the type of cover mounting that is used. In the case of a sliding cover the interlock may include a simple movable probe that engages into a recess or hole formed in the cover to prevent cover movement while the probe is engaged in the recess. The probe is then movable in response to movement of the movable switch contacts into engagement with the earth switch contacts, movement being transmitted by any suitable linkage. An arrangment operating on similar principles can also be used in connection with a pivotal cover. In the case of a pivotal cover the cap for the auxiliary socket, together with any associated equipment, may conveniently be secured to the cover in a location such that the cup engages the auxiliary socket when the cover is closed and moves outwardly therefrom when the cover is opened.

A further interlock may also be incorporated that, when the cover is open, positively prevents the switch contacts from connecting the input and output contacts.

The foregoing introduction has been written in terms of a single set of contacts and switch means, each with an associated connector unit, which would form a single phase switch unit. More generally, however, the chamber will house three such sets of contacts and switch means, one for each phase of a three-phase supply, all three phases being simultaneously earthed. Each phase has a conductor passing through a wall of the chamber, and a connector unit in association with each conductor, the connector units being located in a common housing and their test unit contacts being shielded by a common cover.

In order that the invention may be better understood specific embodiments of switchgear in accordance therewith will now be described in more detail, by way of example only, with reference to the accompanying drawings in which.

Figure 1:
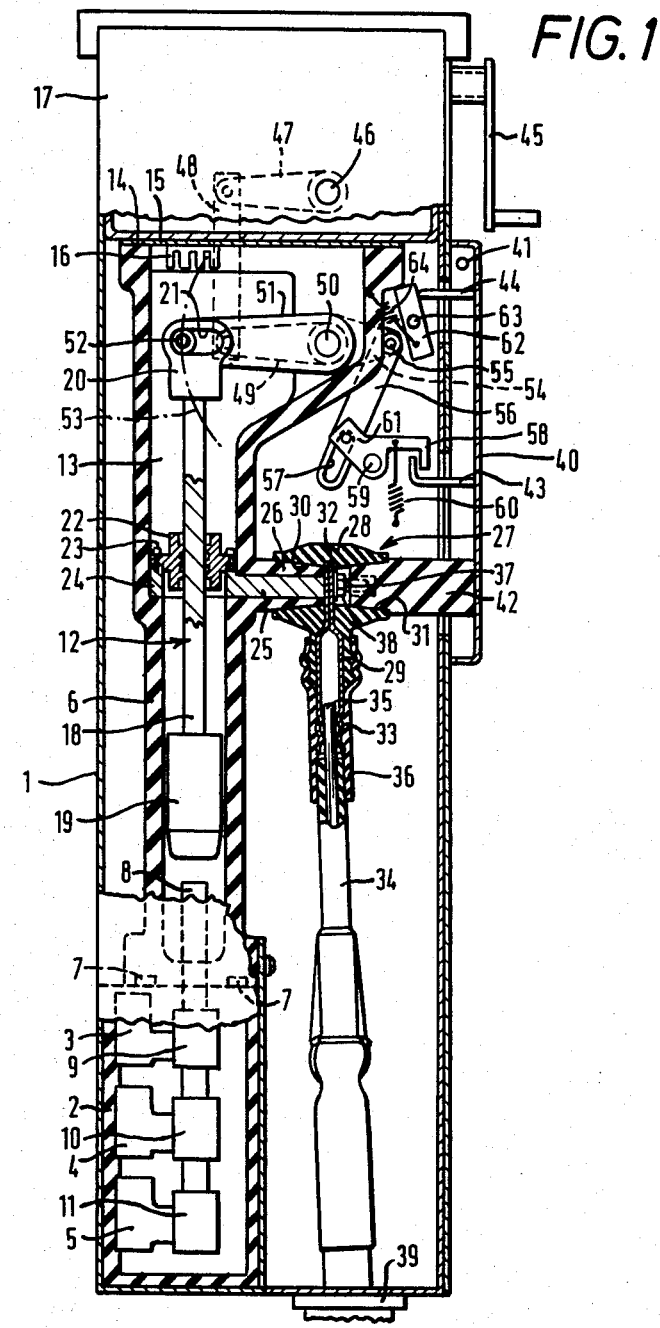
FIG. 1 shows partly in side elevation and partly in section a first embodiment of switchgear according to the invention.

Referring to FIG. 1 there is shown an electrical switchgear enclosed within a housing 1 having a screened metal cover connected to earth. A screened bus bar chamber 2 is defined within the housing in which are supported three supply bus bars 3 to 5, one for each phase of a three-phase supply. The housing contains one or more switch chambers 6, each mounted on the bus bar chamber and secured thereto by bolts such as 7. Each switch chamber contains three input contacts such as 8, one contact for each phase, the contacts being spaced apart perpendicular to the plane of the paper in FIG. 1. Each contact is electrically connected by a respective one of connectors 9 to 11 to a respective one of the bus bars 3 to 5.

Each contact chamber contains three movable switch means 12, to be described in the more detail later, each movable switch means and its associated input contact being separated from those of the next phase by an insulating phase barrier 13 within the switch chamber. The switch chamber terminates in an open top defining a flange 14, the top being closable by a cover plate 15 secured to the flange with a sealing element between the cover plate and the flange so hermetically sealing the switch chamber. The cover plate 15 carries earth contacts 16 each engageable by one of the movable switch means 12. Positioned above the switch chamber is a further chamber 17 containing any suitable switch operating mechanism, which mechanism does not form part of the invention and is accordingly not shown in any detail.

Each movable switch means comprises an electrically conductive stem 18 carrying at its lower end a suitable arc control arrangement 19 engageable with the input contact 8 when the switch means is lowered from the position shown in FIG. 1. The upper end of stem 12 carries a head 20 formed with a slot 21 and also carries contacts engageable with the earth contacts 16 when the movable switch means is raised from the position shown in FIG. 1 to the position shown in FIG. 2. The step 12 is in sliding engagement with an output contact in the form of a conductive sleeve 22 secured by bolts such as 23 to an annular section 24 of a conductor 25 extending through a tapered plug 26 projecting from a wall of the switch chamber. This arrangement is duplicated for each of the three phases and accordingly three plugs 26 each with an associated conductor 25 project from the switch chamber. The switch chamber is conveniently cast as a one-piece unit from a suitable insulating resin material, the phase barriers 13 and the tapered plugs 26 being integral with the rest of the chamber, and the conductors 25 being cast in situ in the chamber. A connector unit (27) located externally of the chamber (6) and providing first contact means (32) for connection to the conductor (25), second contact means (33) for connection to an output conductor (34) and third contact means (37) for connection to a test unit.

Associated with each of the conductors and its tapered plug 26 is a conductor unit 27 comprising a housing moulded from electrically insulating material and defining a body section 28 and a stem 29 projecting transversely from the body section. An inwardly tapering socket 30 opens into the body section from one end thereof, and an auxiliary socket 31 coaxial with the socket 30 opens into the body section from the other end thereof. A conductive terminal 32 is moulded in situ in the housing, the terminal having a part lying at the inner end of the socket 30 and exposed both to the socket 30 and to the auxiliary socket 31. The terminal passes through the stem 29 of the housing to terminate in a conductor connection section 33 lying externally of the housing.

The connector unit 27 allows an output cable 34 to be electrically connected to the conductor 25. To effect such connection the end of the cable 34 is stripped and the core 35 is inserted into the hollow connection section 33 of the terminal 32, which is then crimped onto the core. The connection is protected by a barrier of insulating material 36 of any suitable form, for example a sleeve suitably secured in position over the joint, a sleeve heat-shrunk into position around the joint or self-amalgamating tape wound around the joint. After connection of the cable the socket 30 is engaged onto the tapered plug 26 and pushed onto the plug until the conductor 25 engages the terminal 32 as shown in FIG. 1. In this position a threaded extension 37 from the conductor 25 projects through a hole in the end of the terminal 32 and the assembly is secured by a nut 38 tightened onto the threaded extension. Three output cables, one for each phase, are connected to the respective conductors 25 and the cables are brought together and leave the housing through a gland 39.

The housing has a cover 40 pivotally connected thereto about an axis 41. The cover carries three caps 42, one for each phase, each cap being receivable in the auxiliary socket 31 of the associated connector unit 27. The cap may be a simple closure for the auxiliary socket, or may incorporate a fault flow indicator of any conventional design in suitable electrical connection with the end of conductor 25. Alternatively, or additionally the cap may incorporate a screen from which a low voltage can be taken for any purpose, for example powering a neon indicator controlled by push button from outside the cover 40, or phasing out using a low voltage, high impedance instrument. Indicators may be viewed through windows formed on the cover 40. The cover 40 carries a latch 43 and probe 44 by way of which the cover is interlocked with the movable switch means as will now be described.

As already stated, the chamber 17 houses an operating mechanism for driving the movable switch means under control of an operating lever 45, and incorporating a selector. The selector is used to control the mechanism so that it can either drive the movable switch means from the off position shown in FIG. 1 downwardly into an on position where the arc control assembly 19 engages the input contacts 8 and vice versa, or drive the movable switch contacts from the off position shown in FIG. 1 upwardly to the earth position shown in FIG. 2. The selector prevents the movable contacts from being driven direct from the on position to the earth position or vice versa.

Drive from the operating mechanism is transmitted from an output shaft 46 through a lever 47, link 48 and lever 49 to a switch operating shaft 50 terminating outwardly of the switch chamber and extending through seals in the walls of the chamber to extend the full length of the chamber. The shaft 50 within the chamber carries three levers 51, one for each phase, each lever carrying at its free end a roller 52 received in the slot 21 of the head piece of the movable switch means. The arc of travel of the centre of the roller 52 from the off position to the on and earth positions is indicated by arc 53 in FIG. 1.

Part of the shaft 50 lying outside the switch chamber carries a lever 54 pivotally connected at 55 to a lever 56 having a slot 57 in the free end thereof. A hook 58 is pivoted on the housing about an axis 59 and biased clockwise about its pivot by a tension spring 60. An arm 61 of the hook carries a pin engaged in the slot 57. The hook 58 normally engages the latch 43 as shown in FIG. 1.

A lever 62 is pivoted on the housing about axis 63 and biased in a clockwise direction against that axis by a tension spring 64 engaging one arm of the lever, the other arm being engageable by the probe 44.

When the movable switch means are in the open position as shown in FIG. 1 it will be seen that the hook 58 engages the latch 43 to hold the cover 40 in the closed position, so preventing access to the interior of the housing. The probe 44 holds the lever 62 in position against the action of the spring 64. If the movable switch means are driven downwardly to their closed position, levers 51 and 54 pivot anti-clockwise and lever 56 is raised, the slot 57 running on the pin of the arm 61 of hook 58, so holding the hook 58 in the cover-closed position. If the movable switch means are then opened the parts return to the position shown in FIG. 1, the cover still being locked against opening.

Figure 2:
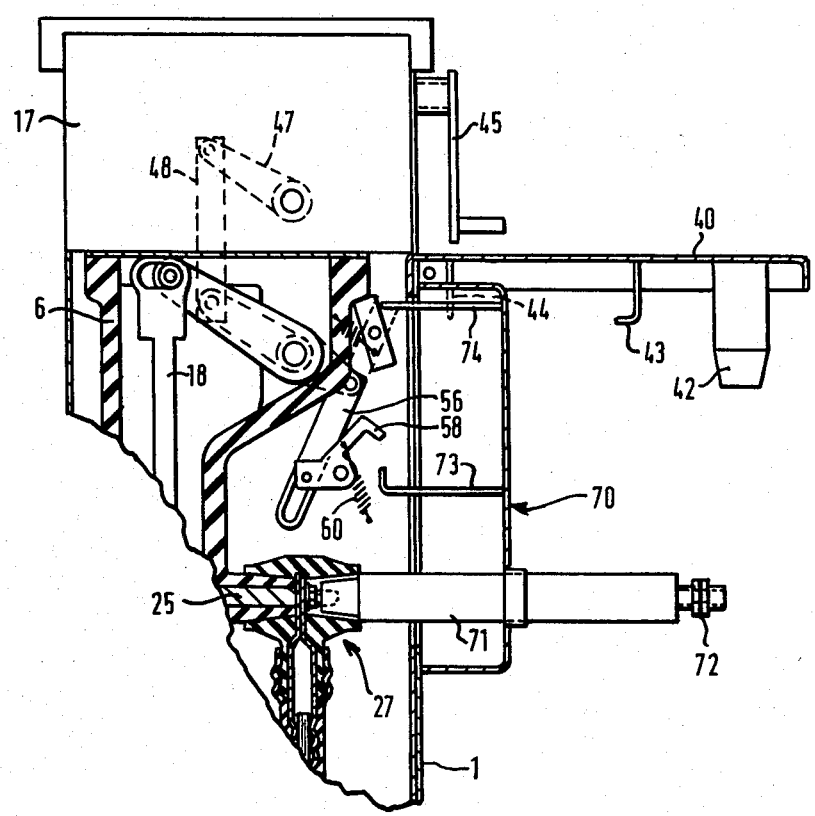
FIG. 2 shows part of the switchgear of FIG. 1 in an earthed condition.

If now the movable switch means are driven upwardly to the earth position shown in FIG. 2 the levers 51 and 54 are pivoted clockwise and lever 56 moves downwardly to pivot the hook 58 anti-clockwise against the action of the spring 60 so moving it out of engagement with the latch 43. The cover can then be pivoted to the open position shown in FIG. 2, the movement removing the probe 44 from contact with the lever 62 so allowing this to pivot clockwise under the action of the spring 64. In this position the lever lies adjacent the end of the lever 56 so positively prevent upward movement thereof and correspondingly preventing anti-clockwise movement of the lever 51 and downward movement of the movable switch means 12. With the cover 40 open a test unit 70 may be mounted on the housing, the unit having probes 71 which can electrically engage the ends of the conductors 25 and which provide electrical connection points 72 externally of the housing 1. The unit 70 carries a latch 73 and a probe 74 which, when the unit is properly positioned lie in the positions adopted by the latch and the probe of the cover 40. The action of the probe 74 allows anti-clockwise movement of the lever 51 so that the movable switch means can be driven to the off position, the test unit 70 then being locked in position by engagement of the hook 58 with the latch 73. The output conductors are thus electrically connected to the test probes 71 and any necessary testing can readily be carried out. A further mechanical interlock may be incorporated to prevent the movable switch means being driven downwardly to the on position when the test unit is in position, the further interlock being released only when the lever 45 is in the closed position. Alternatively the cover, when open, may give a signal to a logic circuit controlling the switch mechanism to make switching to the on position impossible.

Figure 3:
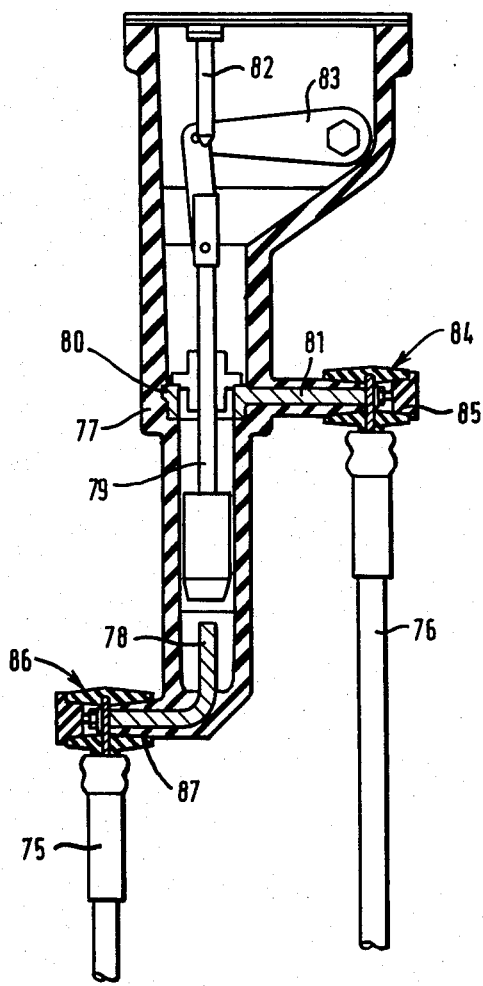
FIG. 3 shows a second embodiment of switchgear according to the invention.

FIG. 3 shows schematically part of an assembly similar to that of FIGS. 1 and 2, with the enclosing housing and interlocks omitted. In this instance the unit is designed for use with a single input cable 75 and a single output cable 76, rather than an integrated three-phase supply. Accordingly a cast chamber 77 accommodates only a single input contact 78, movable switch means 79 and output contact 80 integral with or connected to conductor 81, and a single earth contact 82. The movable switch means is driven through a lever 83 from a drive mechanism (not shown). The output cable is connected to the conductor 81 by a conductor unit 84 of the general form shown in FIG. 1, providing a test connection within its auxiliary socket 85. The input cable 75 may be connected to the input contact 78 by a further connector unit 86, similar to the unit 84, the input contact 78 being cast in-situ in the chamber and having part extending through a tapered section 87 moulded integrally with the chamber. The enclosing housing is similar to that of FIG. 1 and includes covers in the regions of both connector units 84, 86 so that testing can, if necessary, be carried out at each unit. Interlocks similar to those of FIG. 1 will be provided in the region of each openable cover.

Figure 4:
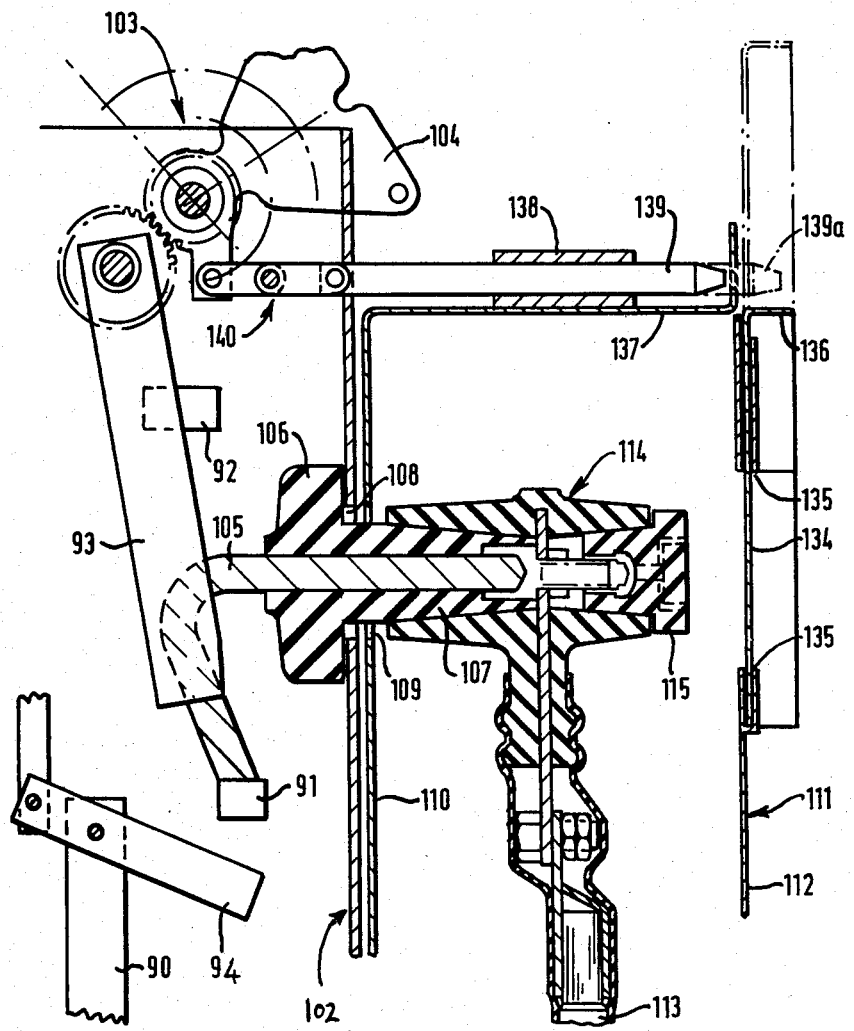
FIG. 4 shows part of a third embodiment of switchgear according to the invention.

FIG. 4 shows part of an alternative arrangement of switchgear comprising, for each of three phases, input contacts 90, output contacts 91 and earth contacts 92 located within a contact chamber 102. Switch means comprising switching blades 93, 94 may connect, respectively, input and output contacts, or output and earth contacts of each phase. The unit incorporates any suitable switch driving mechanism, generally indicated at 103, for driving the blades 93, 94. The mechanism is operated by a lever 104 lying to the outside of the housing 102. As shown in FIG. 4 the mechanism is shown in the position where the blade 94 connects the output contacts to earth; to move the earth switch blade to the open position the lever 104 is moved anti-clockwise from the position shown in the Figure. As a separate operation the blade 93 may then be pivoted anti-clockwise to connect the input and output contacts.

Each output contact 91 forms part of, or is connected to, a conductor 105 secured by fixing members 106 in the chamber 102. Each conductor 105 extends through a tapered plug 107 passing through an opening 108 in the wall of the chamber 102 and through a hole 109 in a first wall 110 of a cable connector unit shown generally as 111, the unit having a second wall 112 opposite to the wall 110 and also having further walls so that the unit is enclosed with output cables such as 113 issuing from the bottom thereof. The unit 111 is secured to the chamber 102 in any appropriate manner. Each output cable is connected to a respective conductor 105 by a connector unit 114 generally similar to that described in FIG. 1.

The connector unit 114 includes a cap 115 closing an auxiliary socket of the connector unit and desirably incorporating a fault flow indicator and/or a neon indicator. The wall 112 has an access opening for the cap 115, the opening being closed by a slidable cover 134 received in a slideway 135 on the wall and having an upper outwardly projecting flange 136. The closed position of the cover is shown in solid lines in FIG. 4. The part 134 of the cover includes an inspection window through which the plugs and any indicators therein may be viewed.

The top wall 137 of the cable connector unit carries a slideway 138 in which is guided a probe 139 connected by a linkage 140 to the earth switching means. With the earth switch closed the probe 139 takes up the position shown in solid lines in FIG. 3, whereas when the earth switch is opened by anti-clockwise rotating of the lever 104 the probe 139 takes up the position shown in broken lines where the tip 139a of the probe lies above the flange 136 of the cover 134. In this position the cover cannot be moved upwards to expose the opening in the wall 112 and access can thus not be gained to the connectors. With the earth switch closed however, the probe 139 is withdrawn and the cover 134 can then be moved upwardly to the broken line position shown in FIG. 3, so allowing access into the cable connector unit. In this position the caps 115 may be removed and threaded ends of the conductors 105 then form threaded test connections to which test probes may be connected. After test probes have been connected it will then be necessary, for test purposes, to open the earth switch and the cover 134 may be designed to allow movement of the probe so that this action is not interfered with. Suitable additional interlock means may be provided to ensure that, in the open position of the cover, the earth switch cannot be opened until all test probes are properly in place, similarly that the test probes cannot be removed unless the earth switch has once again been closed, and that the input and output contacts cannot be connected when the test probes are in position.

It will be understood that there are many ways in which the particular layout of the switchgear may be varied from that shown in the drawings. Thus, other ways in which sliding or pivoting covers may be mounted on the housing of the cable connector unit may be utilised and there are many ways in which an effective interlock between that cover and the earth switch means can be achieved. To an extent these will be dependent on the particular type of earth switching means used, of which a great variety are in common use. The arrangement of the sockets and terminal of the cable connector unit may also be varied from those shown, although the type of connector shown is particularly advantageous in providing conductor connections and test connections which extend to opposite sides of a common cable terminal and so enable test connections to be made through a wall that is remote from the switchgear. Substantial advantages are thus gained in ease of access and in working space available.

I claim:

1. Electrical switchgear comprising a chamber; input contacts, output contacts and earth contacts located within the chamber; switch means within the chamber for connecting the input and output contacts or for connecting the output and earth contacts; a conductor electrically connected to the output contacts and extending through a wall of the chamber; a connector unit located externally of the chamber and providing first contact means for connection to the conductor, second contact means for connection to an output conductor and third contact means for connection to a test unit; a housing surrounding the connector unit; a cover on the housing, the cover being openable to allow direct access to the third contact means of the connector unit; and interlock means coupled between the switch means and the cover to prevent opening of the cover unless the switch means connects the output and earth contacts.

2. Electrical switchgear according to claim 1 in which the connector unit comprises a housing moulded from electrically insulating material and defining a body section and a stem projecting from the body section, an inwardly tapering socket opening into the body section from one end thereof, an auxiliary socket opening into the body section, and a conductive terminal moulded in situ in the housing, the terminal having a part lying at an inner end of the socket and exposed to the socket and forming the first contact means and a part exposed within the auxiliary socket and forming the third contact means, the terminal passing through the stem of the housing to terminate in a conductor connection section lying externally of the housing and forming the second contact means.

3. Electrical switchgear according to claim 2 in which the conductor extending through a wall of the chamber is surrounded by a tapered plug engageable with the inwardly tapering socket of the connector unit with the conductor in electrical engagement with the terminal where this is exposed to the socket.

4. Electrical switchgear according to claim 3 in which the chamber is moulded from a suitable plastics material, the conductor from the chamber is cast in situ in the chamber and the tapered plug surrounding the conductor in an integral part of the moulded chamber.

5. Electrical switchgear according to claim 1 in which the cover is pivotally mounted on the housing.

6. Electrical switchgear according to claim 2 in which the cover is pivotally mounted on the housing.

7. Electrical switchgear according to claim 6 in which the cover carries a cap that is inserted into the auxiliary socket when the cover is in the closed position.

* * * * *